(12) United States Patent
Brewer (10) Patent No.: US 7,322,144 B2
(45) Date of Patent: Jan. 29, 2008

(54) SYSTEM FOR CREATING DIVING, DABBLING, AND FEEDING DECOYS

(76) Inventor: Thaddeus Andrew Brewer, 9722 Meadow Dr., Converse, TX (US) 78109

( * ) Notice: Subject to any disclaimer, the term of this patent is extended or adjusted under 35 U.S.C. 154(b) by 0 days.

(21) Appl. No.: 11/369,043

(22) Filed: Mar. 6, 2006

(65) Prior Publication Data

US 2006/0207158 A1    Sep. 21, 2006

Related U.S. Application Data

(60) Provisional application No. 60/658,387, filed on Mar. 4, 2005.

(51) Int. Cl.
A01M 31/06    (2006.01)
(52) U.S. Cl. .......................................... 43/3
(58) Field of Classification Search ............ 43/2, 43/3
See application file for complete search history.

(56) References Cited

U.S. PATENT DOCUMENTS

| | | | | |
|---|---|---|---|---|
| 2,747,814 A | * | 5/1956 | Taylor | 242/379.2 |
| 3,000,128 A | | 9/1961 | Mcada | |
| 3,115,721 A | | 12/1963 | Story | |
| 3,689,927 A | | 9/1972 | Boston | |
| 4,375,337 A | * | 3/1983 | Yerger | 366/343 |
| 4,566,214 A | | 1/1986 | McCrory et al. | |
| 5,074,071 A | * | 12/1991 | Dunne | 43/3 |
| 5,233,780 A | * | 8/1993 | Overholt | 43/2 |
| 5,289,654 A | * | 3/1994 | Denny et al. | 43/2 |
| 5,377,439 A | | 1/1995 | Roos et al. | |
| 5,566,491 A | | 10/1996 | Phillips | |
| 6,079,140 A | * | 6/2000 | Brock, IV | 43/3 |
| 6,442,885 B1 | * | 9/2002 | Payne | 43/3 |
| 6,643,971 B2 | | 11/2003 | Daniels | |
| 2003/0061754 A1 | * | 4/2003 | Cicoff et al. | 43/2 |

* cited by examiner

Primary Examiner—Kurt Rowan
(74) Attorney, Agent, or Firm—Jackson Walker L.L.P.

(57) ABSTRACT

An apparatus and method for animating waterfowl decoys to imitate diving, dabbling, and feeding of live waterfowl. An ordinary decoy is attached by a self retractable line device with a locking mechanism to a spool on the shaft of the submersible motorized mechanism. When the submersible motorized mechanism is activated the shaft of the mechanism turns the spool attached to the shaft and winds up the line attached to the decoy causing at least a portion of the decoy to be pulled below the surface of the water. The submersible motorized mechanism has a portable power supply and is attached to a timer mechanism, which subsequently controls the length of time the submersible motorized mechanism is either on or off. The apparatus can also be operated using a remote control. The battery power source, the timer mechanism and the remote control mechanism are housed in a watertight container. A submersible motorized mechanism is attached to the exterior of the watertight housing. The entire battery operated submersible motorized system is weighted and submerged beneath the water surface and rests on the bottom while the ordinary decoy floats at the surface.

1 Claim, 8 Drawing Sheets

SYSTEM FOR CREATING DIVING, DABBLING, AND FEEDING DECOYS

RELATED APPLICATIONS

This application claims priority to U.S. Provisional Patent Application Ser. No. 60/658,387, entitled "SYSTEM FOR CREATING DIVING, DABBLING, AND FEEDING DECOYS" filed on Mar. 4, 2005, having Brewer listed as the inventor, the entire content of which is hereby incorporated by reference.

STATEMENT OF RIGHTS TO INVENTIONS MADE UNDER FEDERALLY SPONSORED RESEARCH

This invention was NOT supported by any governmental grants. The government DOES NOT have any rights in the invention.

BACKGROUND

The present invention is generally related to an apparatus and method for animating waterfowl decoys. More specifically, the invention utilizes a submersible motorized system to animate ordinary waterfowl decoys in a manner that imitates the natural diving, dabbling, and feeding patterns of live waterfowl. In one preferred embodiment, a waterfowl decoy is attached by a line to the submersible motorized system. When the submersible motorized system is activated, the line attached to the decoy is pulled and gives the decoy the appearance of diving, dabbling, or feeding. In a more preferred embodiment, the submersible motorized system is further activated by a preset timing device or a remote control device operated by a user.

Generally, a decoy is an artificial bird or animal, or sometimes even a trained live animal that is used to lure game to a place where it can be observed, captured, or killed. In the past, decoys have been used by hunters to attract game, and the sophistication of decoys has continued to improve with each generation. For example, waterfowl decoys that are used to lure geese and ducks have been adapted and modified to perform a wide variety of animated functions. In recent years, a variety of animated decoys models have been produced in order to replace the non-moving replica style decoys. These animated models utilize moving parts or motorized propulsion systems that are directly part of the waterfowl decoy to attract live waterfowl. However, only a few of these animated models have tried to imitate a diving waterfowl feeding pattern in a body of water.

Inventions that are generally related to animating waterfowl decoys have been described as follows:

U.S. Pat. No. 3,000,128 shows a decoy having a battery powered propelling mechanism. This invention allows the decoy to move on the surface of the water and appear to be swimming, but does not imitate a diving or feeding waterfowl.

U.S. Pat. No. 3,115,721 shows the back half of a decoy having feet that move in response to waves. The decoy of this invention it is not motorized and is limited to a vertical feeding position, and does not simulate any movements associated with a diving duck that returns to the surface.

U.S. Pat. No. 3,689,927 employs the use of a radio receiver and a remote radio transmitter to operate an underwater propeller and rudder for directing the decoy, however this decoy is limited to swimming and does not imitate a diving or feeding waterfowl.

U.S. Pat. No. 4,566,214 shows a battery operated vertical decoy. A motor, weights, and coupling are utilized to create rotational motion to the decoy. This motion causes the water about the decoy to ripple. Although this decoy is motorized, it does not have remote control capability. The movement of the decoy shown in this invention is limited to a full time vertical position, and does not simulate any movements associated with a diving duck that returns to the surface.

U.S. Pat. No. 5,377,439 shows a remotely controlled decoy having a rudder that is responsive to electrical control signals. By controlling the rudder, an operator is able to provide directed locomotion for the decoy. However, again the decoy is limited to simulating swimming activity, and does not imitate a diving or feeding waterfowl.

U.S. Pat. No. 5,566,491, animates floating decoy with air forced through a plastic tube and the air is released underneath the floating decoy. The bubbles create rings and waves around the decoy and simulate movement, but does not imitate a diving or feeding waterfowl.

U.S. Pat. No. 6,643,971 shows a motorized decoy that rotates on an axis about 90° between a horizontal surface position and vertical position. However, this invention is required to have the decoy attached to a stake that is inserted into the ground. Because the entire invention must be implanted into the bottom of the lake or pond, it is limited in depth to the length of the stake. The decoy of this invention does not actually float on the surface of the water, and has a very ridged and un-lifelike feeding movements.

There have been many attempts at creating a decoy that is animated and imitates live waterfowl feeding movements. Many of these inventions are capable of producing waterfowl movement on the surface of the water, but fall short of actually emulating the movements associated with feeding and diving waterfowl. The battery operated submersible motorized system of this invention transforms most non-animated waterfowl decoys into animated decoy that captures the true action of a diving, dabbling, feeding waterfowl in a natural environment. As a result of animation, the invention described herein may attract more live waterfowl to a decoy spread. The battery operated submersible motorized system of this invention is simple to use, convenient to set-up, can operate independently of the observer. Additionally, the invention can be used with most ordinary non-animated decoys to affordably and effectively emulate waterfowl movements.

SUMMARY

The present invention is generally related to an apparatus and method for animating waterfowl decoys. More specifically, the invention utilizes a submersible motorized system to animate ordinary waterfowl decoys in a manner that imitates the natural diving, dabbling, and feeding patterns of live waterfowl.

One aspect of the current invention is a submersible decoy animation apparatus. This decoy animation apparatus is capable of animating waterfowl decoys. The submersible decoy animation apparatus is constructed using a portable power supply; a switch in electronic communication with the portable power supply; an electric motor in electronic communication with the switch, wherein the electric motor drives a shaft, and the shaft is connected to a spool that is capable of rotating when the electric motor is activated; a line having a first end capable of being attached to the spool, and a second end capable of being attached to a waterfowl decoy, wherein the line is longer than about 6 inches in length. A means for protecting the portable power supply, the switch, and the electric motor from water damage when the apparatus is submerged in water is described. In a preferred embodiment, a watertight compartment and a waterproof coatings were used as the means for protecting the portable power supply, the switch and the electric motor from water damage. However other means for protecting components may include anything from epoxy coatings or other types of waterproof containers.

The portable power supply for the apparatus can be a battery capable of generating about 1 volt to about 240 volts, and the preferred battery is a 12 volt sealed lead battery. The switch also contains a timer capable of switching the electric motor off or on. More specifically, the preferred timer contains a smart chip timer capable of switching the electric motor off or on at pre-defined time intervals. Additionally, the smart card timer has the ability to have programmed or pre-defined time intervals that are in the range of about 0.01 seconds to about 30 days. This means the electric motor can be pre-programmed to be turned on for about 0.01 seconds to about 100 seconds, then the electric motor can be turned off for about 0.01 seconds to about 100 seconds. Many various time patterns are possible. Although the timer can actually be programmed for shorter or longer periods of time, even up to years, such time intervals are probably not practical for imitating the movement of live waterfowl. However, it has been contemplated that a hunter may wish to leave a deployed decoy spread for up to a month or longer, which would require much the time interval to be very flexible.

A remote control activation device capable of switching the electric motor off or on by a remote user may also be part of the switch, or used in combination with the switch. In a preferred embodiment, the remote control activation device can be a two way radio device. All of the water sensitive components should be housed in a watertight compartment during operation. For example, before the decoy animation apparatus is submerged in water, each of the water sensitive components could be placed in a watertight container. In a preferred embodiment, the watertight container is a cylindrical container that is closed on one end and having a pressure-sealed lid on the other end. The pressure-sealed lid can be constructed to have an upper plate, a lower plate, a rubber gasket, a screw down wing nut with a bolt, and a carrying handle with a mounting stud. In order to keep the watertight container submerged during operation, weights can be used either inside or outside of the watertight container. Alternatively, a stake can be attached to the submersible decoy animation apparatus and placed in the bottom of the lake or pond in order to hold the apparatus below the surface of the water.

The preferred electric motor can be a watertight motor assembly capable of operating underwater. The line that attaches the decoy to the electric motor shaft and spool can be part of a retractable line device with an locking mechanism. The retractable line device should be capable of changing the length of the line between the waterfowl decoy and the spool to adjust for different water depths.

A second aspect of the current invention is a method for animating a waterfowl decoys. The method utilizes the submersible decoy animation apparatus described above. For example, the method includes attaching a waterfowl decoy to a submersible decoy animation apparatus forming an animated waterfowl decoy; placing the animated waterfowl decoy into the water, such that the waterfowl decoy is floating on the surface of the water, and the submersible decoy animation apparatus is below the surface of the water; activating the electric motor for a first period of time, wherein the first period of time is long enough to rotate the first end of the line around the spool and pulling at least a portion of the waterfowl decoy below the surface of the water forming a submerged waterfowl decoy; and then deactivating the motor for a second period of time and allowing the submerged waterfowl decoy to return to the surface of the water. In a preferred embodiment, a timer having a smart chip timer is capable of pre-programmed time intervals that are in the range of about 0.01 seconds to about 1,000 seconds on, and about 0.01 seconds to about 30 days off.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

The current invention is generally related an apparatus and method for animating waterfowl decoys. This invention utilizes a submersible motorized system to animate ordinary waterfowl decoys in a manner that imitates the natural diving, dabbling, and feeding patterns of live waterfowl. Generally, a waterfowl decoy is attached by a line connected to a submersible motorized system. The submersible motorized system is in electrical communication with a switch and timing device. Alternatively, the submersible motorized system has a remote control activation device, which is controlled by an operator directly. When the submersible motorized system is activated at predetermined time intervals, the line attached to the decoy is pulled, which gives the decoy the appearance of diving, dabbling, or feeding. An ordinary non-animated waterfowl decoy can be used in combination with the current invention to:

(a) provide an animated diving, dabbling, and feeding waterfowl decoy that may attract live waterfowl to the vicinity;
(b) provide waterfowl decoy motion and create water movement, which may provide potential eye catching attention to a decoy spread;
(c) provide water movement that may prevent the water from freezing around a decoy spread during freezing conditions, which may further provide an enticement for live waterfowl to approach the unfrozen area; and
(d) provide waterfowl hunters and observers with a convenient, easy to use, cost effective, method of animating their existing non-animated decoys.

Generally, the diving, dabbling, and feeding activity of a decoy is accomplished when a submersible motorized mechanism is activated by the power source contained in a watertight housing. The submersible motorized mechanism's shaft containing a spool will turn. The spool will retract a line that is attached between the submersible motorized mechanism and the decoy. As the spool winds the line causing at least a portion of the decoy to be pulled under the surface of the water, which simulates diving, dabbling, and feeding activity of a live waterfowl.

The diving, dabbling, and feeding activity is enhanced by the varying settings of the timer mechanism, which controls the length of time the submersible motorized mechanism is either on or off. The speed at which the submersible motorized mechanism runs can also be changed. The simulated activity is further enhanced by the presence of a remote control mechanism that allows the user to simulate diving, dabbling, and feeding activity of live waterfowl "on demand," and in addition to the settings of the timer mechanism.

These and other objects of the present invention will become readily apparent upon further review of the following examples and drawings.

EXAMPLES

The following examples are provided to further illustrate this invention and the manner in which it may be carried out. It will be understood, however, that the specific details given in the examples have been chosen for purposes of illustration only and not be construed as limiting the invention.

Example 1

The embodiments shown and described above are only exemplary. Even though several characteristics and advantages of the present invention have been set forth in the foregoing description together with details of the invention, the disclosure is illustrative only and changes may be made within the principles of the invention to the full extent indicated by the broad general meaning of the terms used in herein and in the attached claim.

Figure 1:
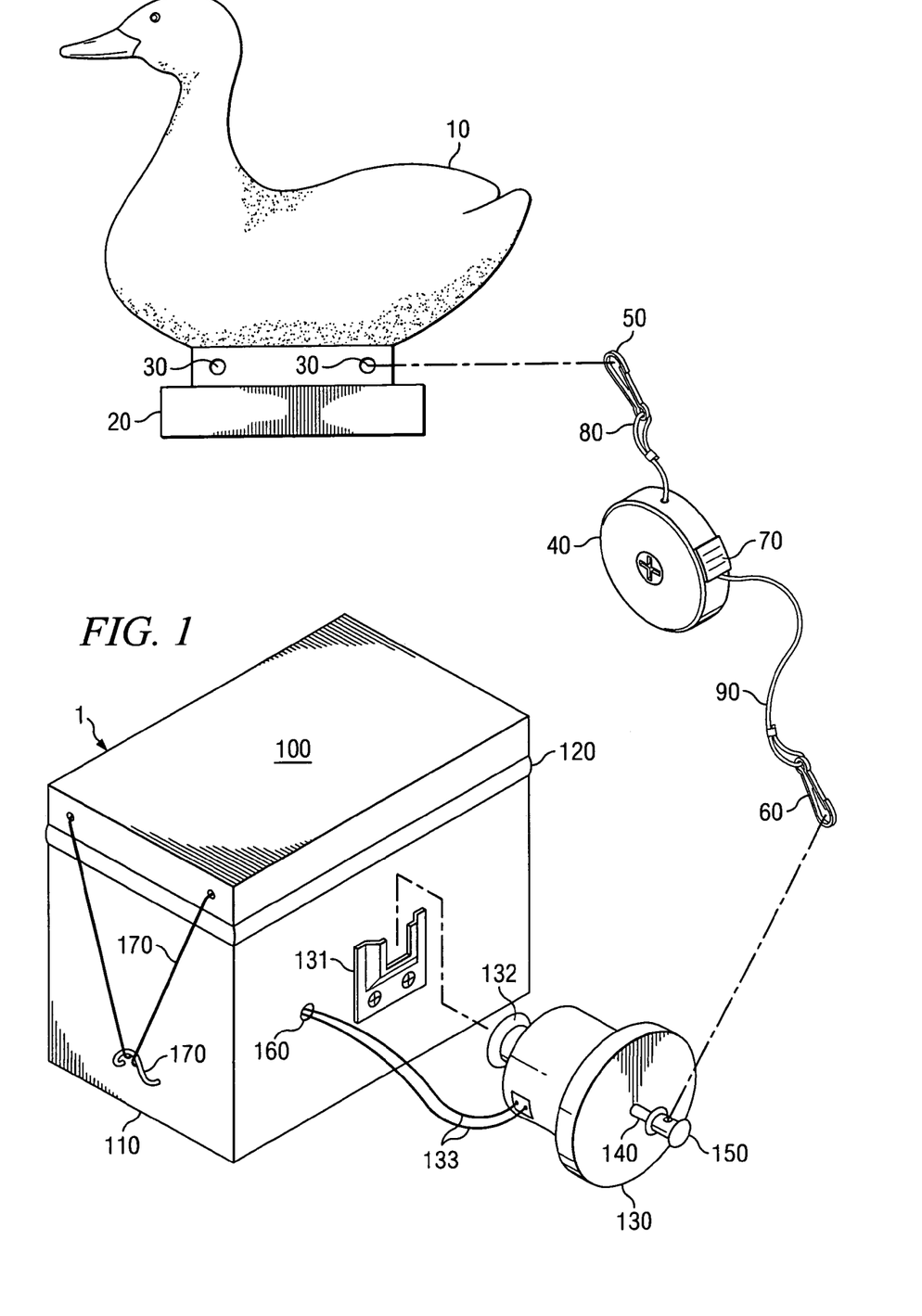
FIG. 1 shows the submersible motorized system with an ordinary decoy.

FIG. 1 shows a diagram of the preferred submersible motorized system (1) connected with a line to an ordinary decoy having keel (10). The decoy keel (20) is attached to the decoy body and is generally utilized for stabilizing the decoy in the water. The decoy keel has keel holes (30) that are typically used for securing the decoy to a line having a weight. In the current invention, a retractable line device (40) with an optional locking mechanism connects the decoy (10) to the submersible motorized system (1). The first end of the retractable line device (40) may contain a decoy clip (50), which connects the decoy to the retractable line device using a line (80). A spool clip (60) of the retractable line device is connected to the submersible motorized system. The optional locking mechanism (70) may be present as part of the retractable line device (40). A second end of the retractable line device (90) connects indirectly the decoy to a shaft spool (150) of the submersible motorized system (1).

The submersible motorized system (1) generally contains only a few components, for example, a watertight housing compartment (110) with a water tight lid (100), a power supply (not shown), and a motor (130). The motor may be mounted inside or outside of the watertight housing compartment. The water tight seal (120) helps to prevent water from entering the compartment and wetting the power supply (i.e. battery) and other water sensitive electronics (not shown) that are held inside the compartment. If the motor is to be mounted outside the watertight compartment using an optional mounting bracket (131), which can be located almost anywhere on the exterior body of the watertight housing container or exterior surface of the water tight lid (100). Additionally, a mounting stud (132) located on the butt end of the submersible motorized mechanism and a "power-in" wire (133) are used for mounting and supplying power to the submersible motorized mechanism. The submersible motorized mechanism has a shaft (140) that rotates when the motor is activated. The end of the shaft (140) may also provide a spool (150) that rotates when the motor is activated. A watertight opening in the housing container (160) allows for wires to transverse the container wall. In a preferred embodiment, the watertight housing sealing system (170) provides clamps/seals to secure the lid of the watertight housing to the body container of the watertight housing making the entire watertight housing watertight. However, any means that allows the equipment to remain dry and functional will be useful for this invention. For example, any shape of watertight container (i.e. box, cylinder, sphere, etc.), or any type of waterproof coating (e.g. epoxy, rubber, plastic, etc.), or combination of both can be utilized to protect water sensitive components of the invention.

In one preferred embodiment, a box-shaped watertight housing compartment (110) with the watertight lid (100) helps protect components placed on the inside from water contact. For example, some components that are inside the watertight housing compartment (110) are shown in FIGS. 4, 7, 8, 9, 12, and 13. The battery power source (180) that is used for powering the battery operated submersible motorized system should be protected from contacting water. The switch and timer mechanism (190) that controls the submersible motorized mechanism's length of time on or off and speed of operation, the length of time controller (191), and the wiring leads (192) (193) (194) all need protection from water. In a preferred embodiment, the switch, timer mechanism and wiring leads are encased in a silicone or a potting epoxy resin (e.g. GE 3110 RTV, Dow Corning RTV 3110, Alumilite Quickset RTV, and many others, Alumilite Corporation, Kalamazoo, Mich. 49007). The most common silicone compounds that can be used are RTV or "Room Temperature Vulcanizing" silicones which are mixed in two parts (a base and a catalyst) to induce curing. A silicone mixture can be poured or spread over the electronics in a mold and allowed to cure. Another option is to coat or encase the electronics in "hot glue," which is available at most hardware stores. In a preferred embodiment, a silicone Elastomer (e.g. SYLGARD 170, Dow Corning, Midland, Mich.) was used for impregnating high-voltage transformers and capacitors, potting of electronic circuits and assemblies, encapsulating chip carriers and microcircuits. Slygard 170 is a black, low viscosity, fire resistant material that is easy to process and has excellent temperature stability and electrical properties.

Figure 7:
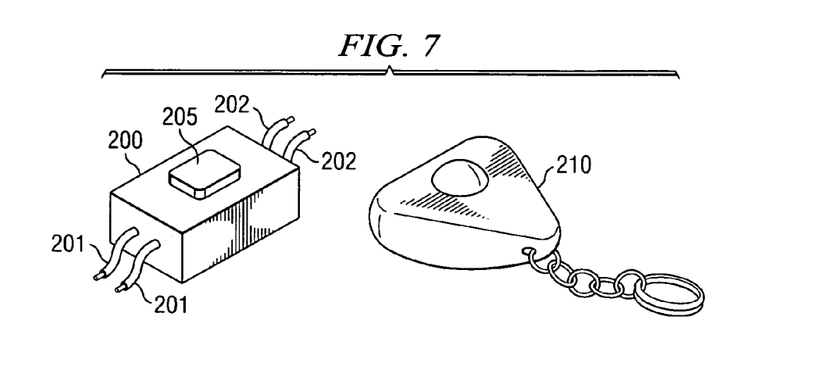
FIG. 7 shows a remote control mechanism and hand held controller.
Figure 16:
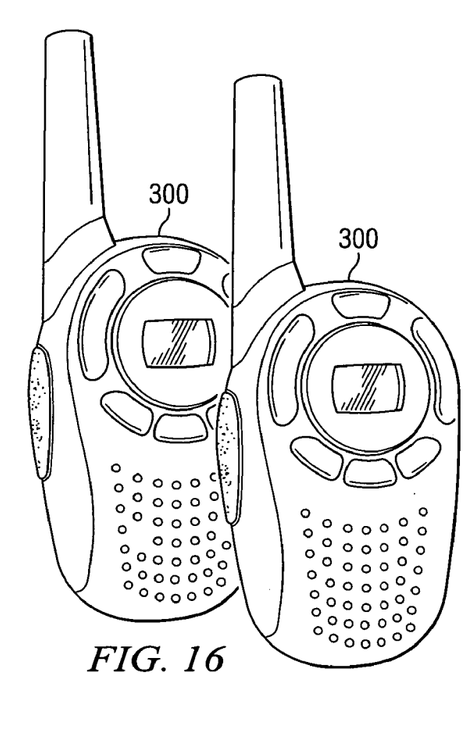
FIG. 16 shows a pair of two way radios that can be used as a remote control device to activate the submersible motorized mechanism.

In addition to the timer mechanism controls, an operator can use a remote control mechanism (200) having an antenna (205) to control the submersible motorized mechanism's length of time on/off and speed of operation with a hand held controller from a distance away from the battery operated submersible motorized system. The "power-in" wiring (201) and "power-out" wiring (202) are illustrate in FIG. 7. One example of a hand held remote control mechanism controller (210), as illustrated in FIG. 7, is similar to a keychain auto alarm switch. This modified remote auto alarm switch can operate the remote control mechanism (200) from above the surface of the water and from a distance away, even though the battery operated submersible motorized system is slightly below the surface of the water. To increase the effective range of remote controlled systems, an antenna wire can be designed to project above the surface of the water. The antenna wire could even become part of the decoy. Another example of a hand held remote control, as illustrated in FIG. 16, are a pair of two way radios. The preferred two way radio allows an operator to activate the submersible motorized system in water that is up to about 3 feet deep. However, the use of a stronger two way radio signal allows operation of the submersible motorized system at deeper depths, or at a greater distance away from the submersible motorized system.

Example 2

Figure 2:
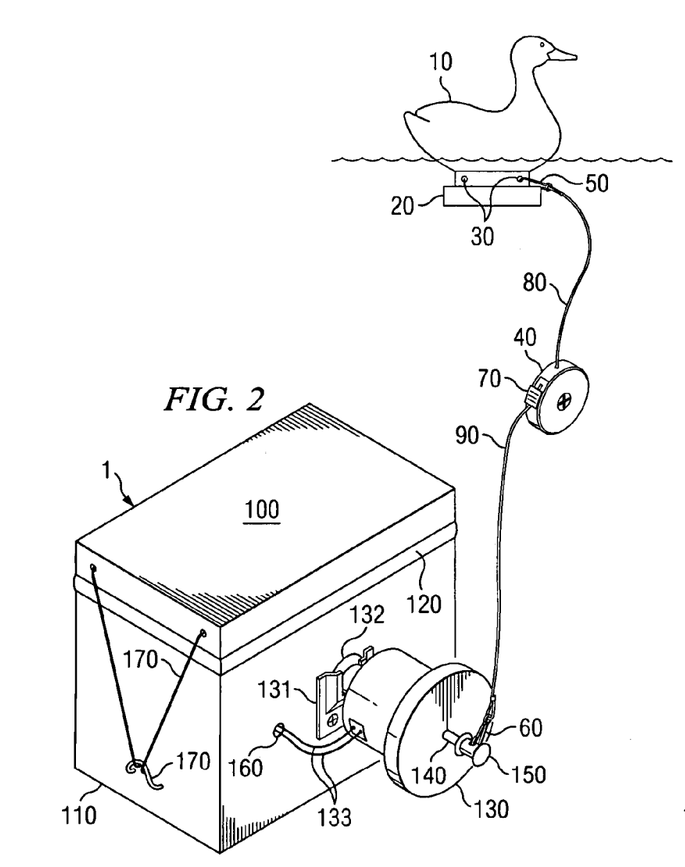
FIG. 2 shows the decoy setting on the top of the water attached to the submersible motorized system at a time when the motor is not engaged.
Figure 3:
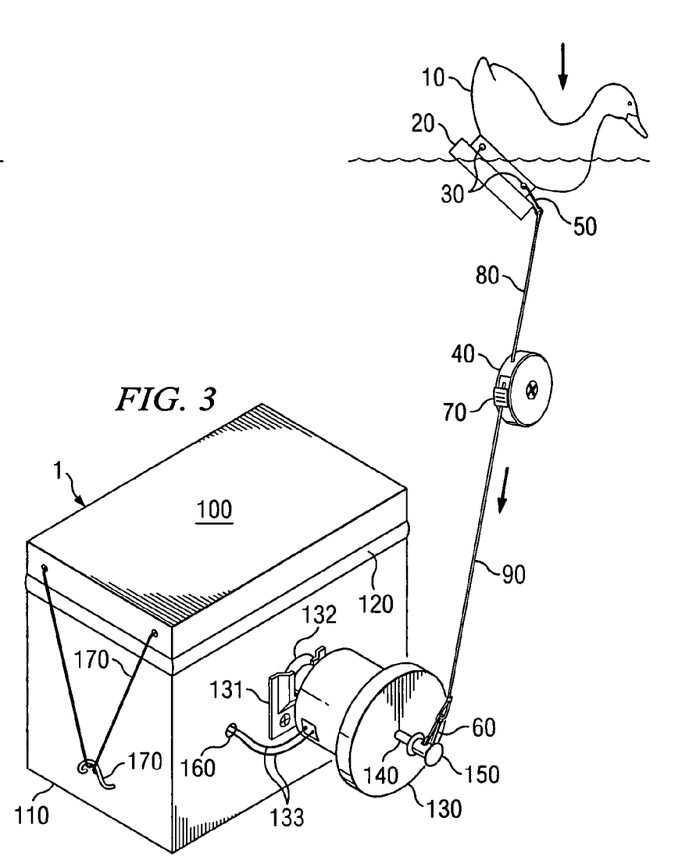
FIG. 3 shows the decoy setting on the top of the water attached to the submersible motorized system at a time when the motor is engaged, and at least a portion of the decoy is pulled under the water line.

FIG. 2 and FIG. 3 show a waterfowl decoy before and after the submersible motorized system is activated. For example, FIG. 2 shows a waterfowl decoy (10) is sitting motionless in a horizontal position floating on the surface of the water. The line (80, 90) that connects the decoy (10) to the submersible motorized system (1) has substantially no tension when the motor is not activated. The line is part of a retractable line device having locking mechanism (40). A first end of the line also contains a decoy clip (50) and is clipped into the decoy's (10) keel hole (30). A second end of the line has a spool clip (60), which is attached to the spool (150) on the shaft (140) of the submersible motorized mechanism (130). Alternatively, a spring wound-tie off retracting device can also be used for connecting the decoy to the submersible motorized mechanism (130). Additionally, a retractable device that is manually wound and set rather than spring loaded and tied off has also been contemplated to be useful for this invention. The submersible motor (130) is mounted to the body container of the watertight housing (110). The submersible motor (130) may be mounted on the watertight housing using a mounting bracket (131) and a mounting stud (132). Water sensitive components (e.g. power source, the electric switch, the timer mechanism, and the remote control mechanism) are placed inside the watertight housing before the motorized system is submerged. As long as the submersible motor (130) is not receiving power, the decoy (10) remains on the surface, and the line (80, 90) remains slack.

In contrast, when the submersible motorized system is activated, either by a timer or by a user's remote control, at least a portion of the decoy that was not submerged previously is pulled below the water's surface. More specifically when the motor mechanism (130) is activated, the shaft (140) turns and the line (90) begins winding around the spool (150). Because the locking mechanism (70) of the retractable line device (40) is locked, the tension on the line (80, 90) increases until at least a portion of the decoy (10) is pulled below the surface of the water, as shown in FIG. 3. When the motor mechanism (130) is de-activated, the tension on the line (80, 90) is released and the decoy returns to the surface of the water, as shown in FIG. 2. By repeatedly activating and deactivating the motor mechanism (130), it is possible to animate the decoy to imitate the natural diving, dabbling, and feeding patterns of live waterfowl.

Figure 4:
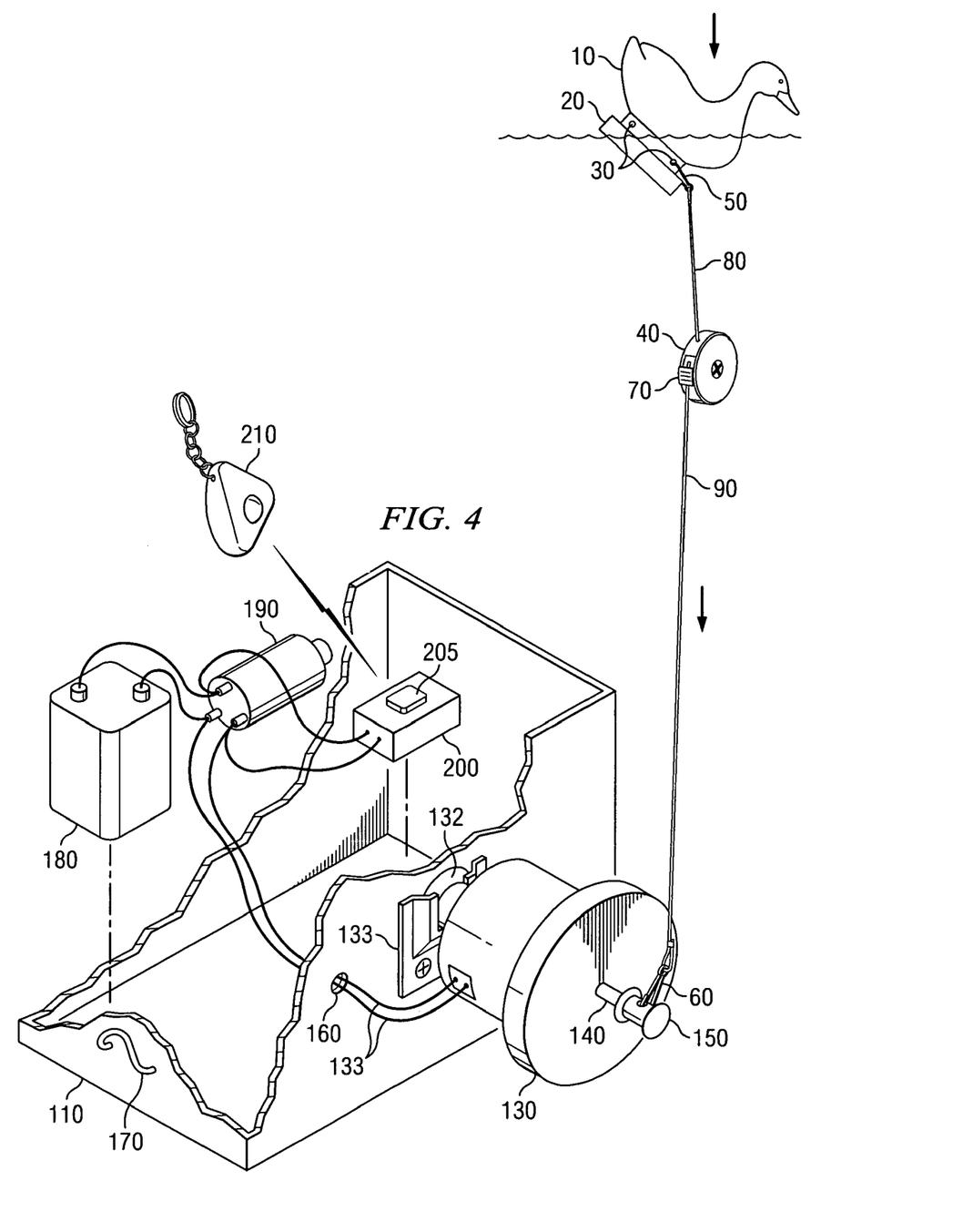
FIG. 4 shows the decoy setting on the top of the water attached to the submersible motorized system having a remote controlled activation device (in this drawing, the lid of the watertight housing is removed for illustration only). The motor can be engaged by activating the remote control device causing at least a portion of the decoy to be pulled under the water line.

FIG. 4 shows a view of the battery operated submersible motorized system in action, which is similar to FIG. 3 only the lid of the watertight housing (100) is removed to show the contents of the container of the watertight housing (110). In a preferred embodiment, the battery power source (180) for powering the battery operated submersible motorized system (1) comprises a 12 Volt 7.0 AH battery (Model GH1270 from CBS Battery Technologies, Inc, Fort Worth Tex.). In a preferred embodiment, rechargeable batteries are utilized. A solar panel battery recharging system or other battery recharging system designed to project above the surface of the water may be used to recharge the power source (180). The battery power source ((180), and also shown in FIG. 9) can be any voltage or type of battery, which sufficiently powers the battery operated submersible motorized system. Additionally, wires can also be connected from the submerged system out of the water into a recharging system or alternate power source located on dry land (e.g. a automotive battery or recharging device located in a duck blind). For example, any portable power supply capable of running a portable motor that can pull at least a portion of a waterfowl decoy below the water's surface will be sufficient and is considered to be within the scope and spirit of this invention.

The electric switch and timer mechanism (190), which controls the submersible motorized mechanism's length of time on, off and speed of operation, by length of time controller (191). The wiring leads (192) (193) (194) of the electric switch and timer mechanism are also shown in FIG. 4. However, any portable electric switch with a timer mechanism capable of switching the portable motor off and on at predetermined time intervals will be sufficient and is considered to be within the scope and spirit of this invention.

A remote control mechanism (200) that can be used in addition to the timer mechanism (190) to control the submersible motorized mechanism's length of time on/off and speed of operation. The preferred remote control mechanism comprise at least a pair of hand held two way radios (Model No.: pr 135, Cobra Electronics Corp. Chicago, Ill.), see FIG. 16. The remote control mechanism allows the submersible motorized mechanism to be operated by a sending a signal from one hand held radio controller, which is operated from a distance away from the battery operated submersible motorized system and above the surface of the water, to the other hand held radio located inside the submersible motorized mechanism. Additionally, the use of hand held radios to activate the submersible motorized system allows greater signal strength allowing for longer distance use. By changing the set channel use for individual units, hunters can use the radio to communicate with one another using other designated channels. In a more general description, FIG. 7 shows a remote control mechanism having a "power-in" wiring component (201) and "power-out" wiring (202) component used to receive a signal and operate the motor (130). However, any portable remote control mechanism hand held controller (210), which can operate the remote control mechanism from a distance away from the battery operated submersible motorized system and above the surface of the water will be sufficient and is considered to be within the scope and spirit of this invention.

Figure 5:
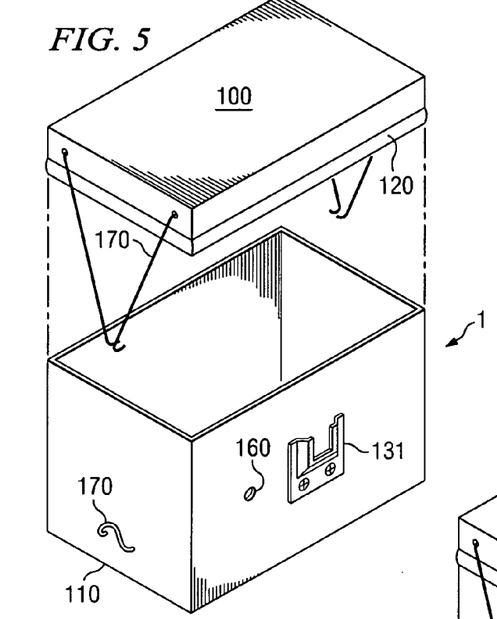
FIG. 5 shows the watertight housing with the lid removed.
Figure 6:
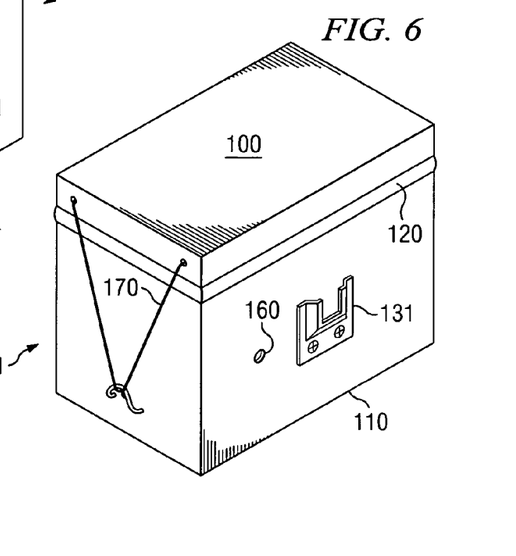
FIG. 6 shows the watertight housing with the lid attached.

A general illustration of the body container of the watertight housing (110) with the lid of the watertight housing (100), and the water tight seal (120) are shown FIG. 5. Any electronic components that are water-sensitive are placed in the sealed compartment before the compartment is submerged. FIG. 5 shows a rectangular box with a lid, a seal, and clamps to hold the lid on the seal to prevent water leakage. In order to prevent the watertight housing from floating on the surface of the water, weights can be placed inside or outside the watertight housing. FIG. 6 shows a view of the lid of the watertight housing (100) compressed down on the body container of the watertight housing (110) by the watertight housing sealing system (170) with the seal between the lid and the body container of the watertight housing (120) preventing water from entering the watertight housing. The sealed wiring opening (160) is also shown. In a preferred embodiment, the watertight housing is a cylindrical bucket that is closed on one end and is open on a second end. Once the electronic components are placed inside the cylindrical bucket, a circular compression seal is inserted into the open end of the cylindrical bucket, see FIG. 15. The compression seal is expanded to seal along the inside walls of the cylindrical bucket by screwing down a wing nut on a bolt which traverses two metal plates that when tightened sandwiches the compression seal outward. The lid may also have a mounted handle. However, any portable container capable holding electronic components in a watertight environment and having watertight holes for traversing electrical wires will be sufficient and is considered to be within the scope and spirit of this invention.

Additionally, a cut and formed piece of metal, plastic or other compound can be placed inside the unit to acts both as additional weight and as an organization device that compartmentalizes the battery, radio and timer unit so that they are prevented from moving around inside the unit.

Figure 8:
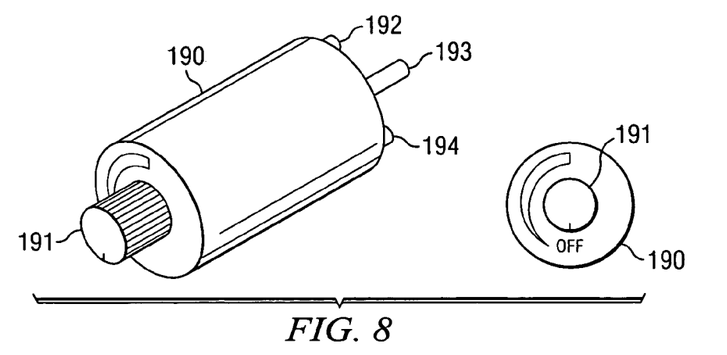
FIG. 8 shows the switch and timer mechanism that controls the length of time the motor remains on off and the speed of operation.
Figure 9:
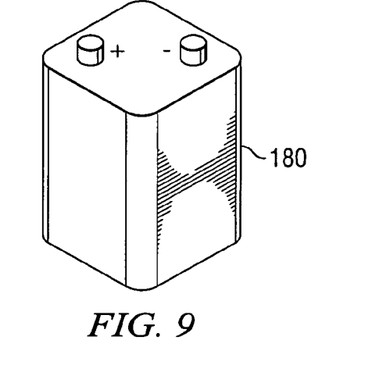
FIG. 9 shows a view of a battery power source that provides power to the submersible motorized system.

FIG. 8 shows an illustration of the timer mechanism (190), which controls the submersible motorized mechanism's (130) length of time on or off, and controls the speed of operation. In a preferred embodiment, the timer mechanism comprises a Bigfoot Minuet Man 2 variable Timer (Molded Parts Specialist, Pantego, Tex.). The wiring leads (192) (193) (194) are also shown in FIG. 8. The wiring leads (192) (193) (194)] are also shown. The timer mechanism (190), and length of time controller (191) have an off position. When in the off position no current is allowed to pass from the battery power source (180) to the submersible motorized mechanism (130). As the length of time controller (191)] is turned on in a clockwise direction the length of time that the submersible motorized mechanism (130) increases as does the speed at which the submersible motorized mechanism (130) operates. However, any portable or programmable timer mechanism capable of switching the portable motor off and on at predetermined time intervals will be sufficient and is considered to be within the scope and spirit of this invention.

Figure 10:
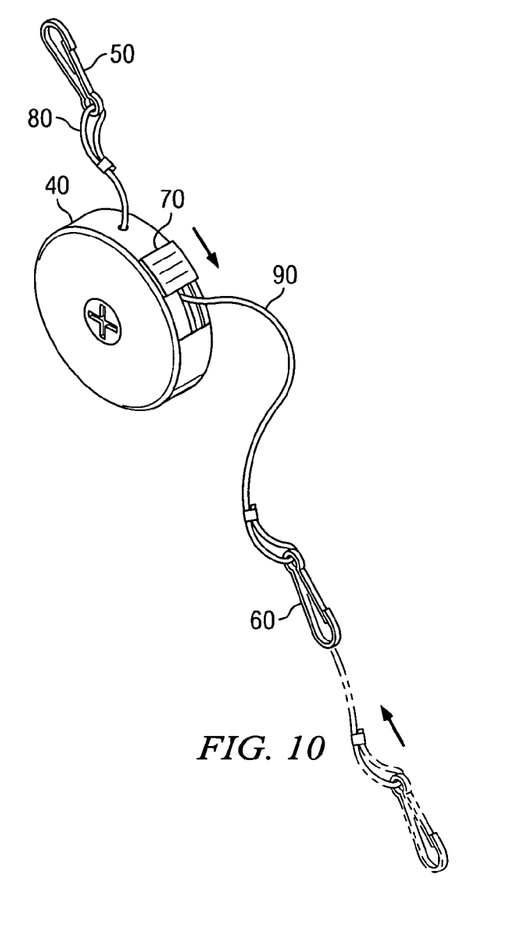
FIG. 10 shows a view of the retractable line device with locking mechanism in an open position.
Figures 11, 12, 13:
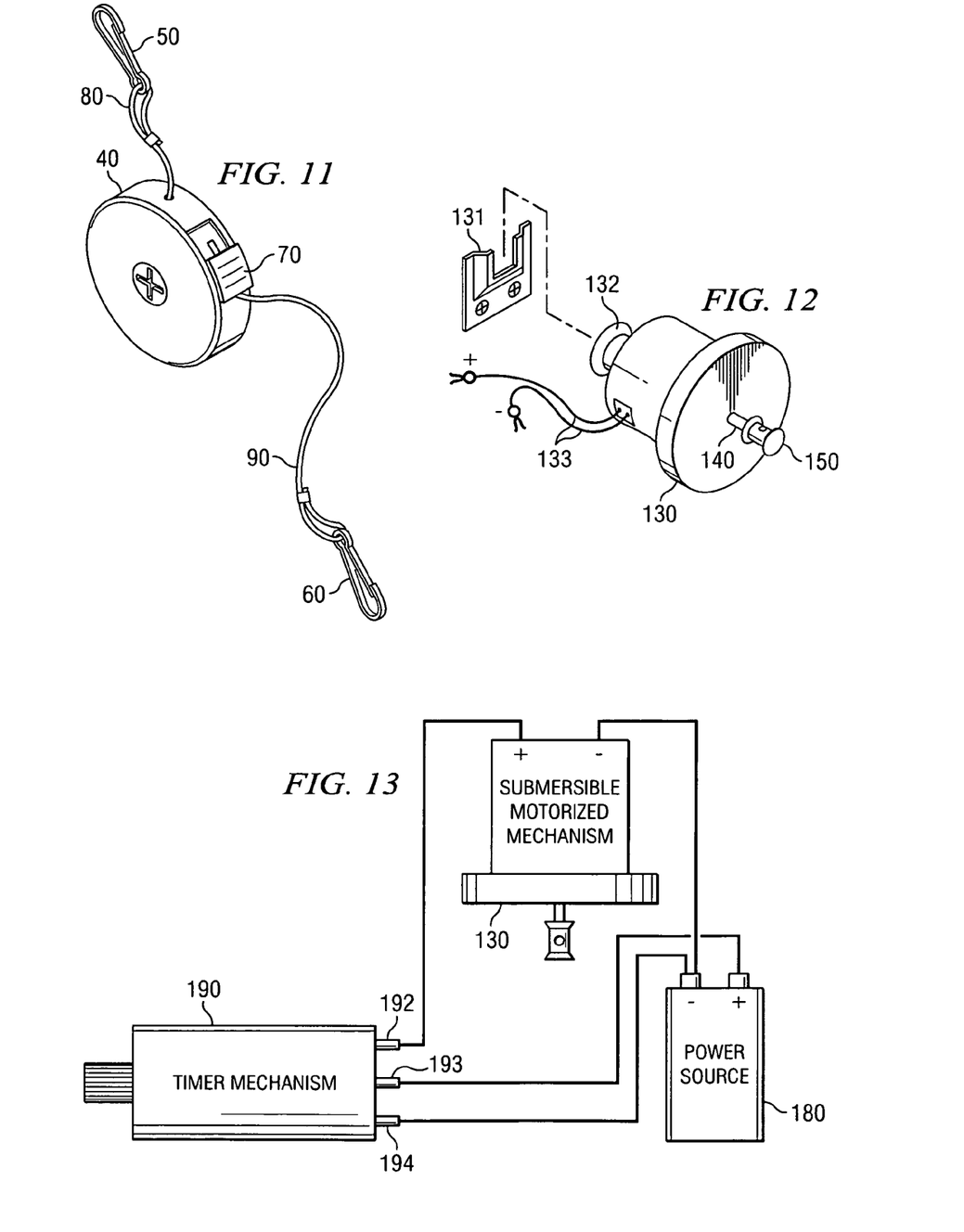
FIG. 11 shows a view of the retractable line device with locking mechanism in a closed position.
FIG. 12 shows a view of the submersible motorized mechanism having a shaft and spool for retracting the line.
FIG. 13 shows a wiring diagram for attaching the timer mechanism to regulate the length of time that the motorized mechanism remains on or off.

FIG. 10 shows the retractable line device (40) having the locking mechanism (70) in the open position, which allows the line to freely exit and retract with little or no tension. The retractable line device with locking mechanism is useful when setting the length of the line connected from the decoys on the water's surface to the submersible motorized system (1) on the bottom of a lake or pond. For example, the submersible motorized system (1) can be attached to the waterfowl decoy and allowed to settle on the bottom of the pond or lake while the attached decoy remains floating on the surface of the water. Once the depth is set, the locking mechanism (70) can be placed in the closed position (See FIG. 11). A closed locking mechanism (70) does not permit any of the line to freely exit or retract. This tension allows the decoy to be pulled, at least partially, underwater when the submersible motorized mechanism (130) is activated. The retractable line device shown in FIGS. 10 and 11 is only one of many such devices. One of ordinary skill in the art will understand that other devices exist for connecting a line between the decoy and the submersible motorized system, and are considered to be within the spirit and scope of the invention (e.g. The Yo Yo reel from Mechanical Fisher Diamond City, Ark.; the EZ Reel from Mallard Machine Springdale, Ark.; item number 64110 metal case chalk line reel from Irwin Industrial Tool Company Wilmington, Ohio).

FIG. 12 shows the submersible motorized mechanism (130), having a shaft (140) and the spool (150). The submersible motorized mechanism (130) can be mounted to the side of the body container of the watertight housing (110) using the mounting stud (132) that slides into the mounting bracket (131). Different sized motors can be used for different sized waterfowl decoys. Alternatively a motor that alternates between high and low speeds or high and low torque can be utilized depending on the size of waterfowl decoy. Additionally, it is also possible to have the motor be located inside a single case making the unit more of a single solid unit, which may be easier for a user to carry. There are many examples of motors that could be modified and useful for this invention (e.g. The First Mate 400 GPH Bilge Pump made by Johnson Pump AB Orebro, Sweden; Heavy Duty Bilge Pump (Part Numbers 4030, 4040, 4060, and 4070) by Attwood Corporation Lowell, Mich.; a V-Series Bilge Pumps (Part Numbers 4204, 4206, 4207, 4208, 4209, 4212 and 4224), by Attwood Corporation Lowell, Mich.).

FIG. 13 shows the wiring diagram for attaching a timer mechanism (190) to the battery power source (180). The timer mechanism (190) is used to activate the submersible motorized mechanism's (130) at defined time intervals. The timer mechanism (190) determines the interval of time that the motor will be on or off. Additionally, the timer can also regulate the speed of operation. As in FIG. 13, the positive wire from the "power-in" wiring of the submersible motorized mechanism (133) is attached to the wiring lead (192) of the timer mechanism (190). The negative wire from the "power-in" wiring of the submersible motorized mechanism (133) is attached to the negative terminal on the battery power source (180). The wiring lead (194) of the timer mechanism (190) is also attached to the negative terminal on the battery power source (180). The wiring lead (193) of the timer mechanism (190) is attached to the positive terminal of the battery power source (180). The timer mechanism (190) is attached and fully functional.

Figure 14:
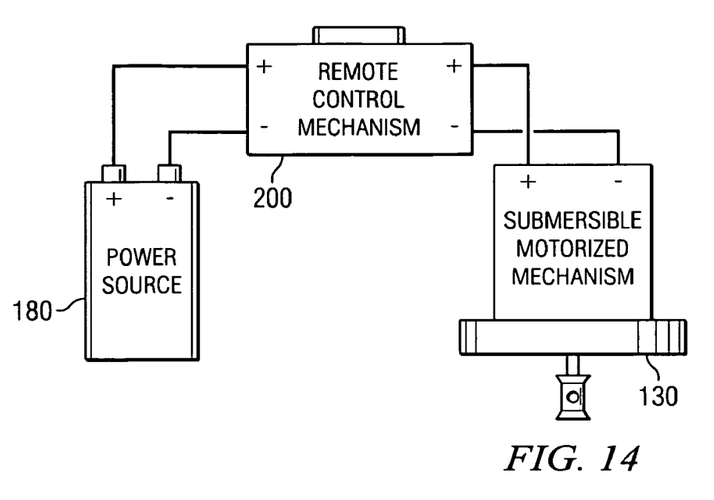
FIG. 14 shows a wiring diagram for attaching the remote control mechanism to regulate the length of time that the motorized mechanism remains on or off.

FIG. 14 shows the wiring diagram for attaching the remote control mechanism (200), which in addition to the timer mechanism (190) controls the length of time and the speed of submersible motorized mechanism's (130). The remote control mechanism (200) interrupts the electrical current from the battery to the motor. For example, the positive battery terminal is in electrical communication with the positive in terminal of the remote control, and the positive out terminal of the remote control unit is in electrical communication with the positive in terminal of the motor. Similarly, the negative battery terminal lead is in electrical communication with the negative in terminal of the remote control unit, and the negative out terminal of the remote control unit is in electrical communication with the negative in terminal of the motor.

Figure 17:
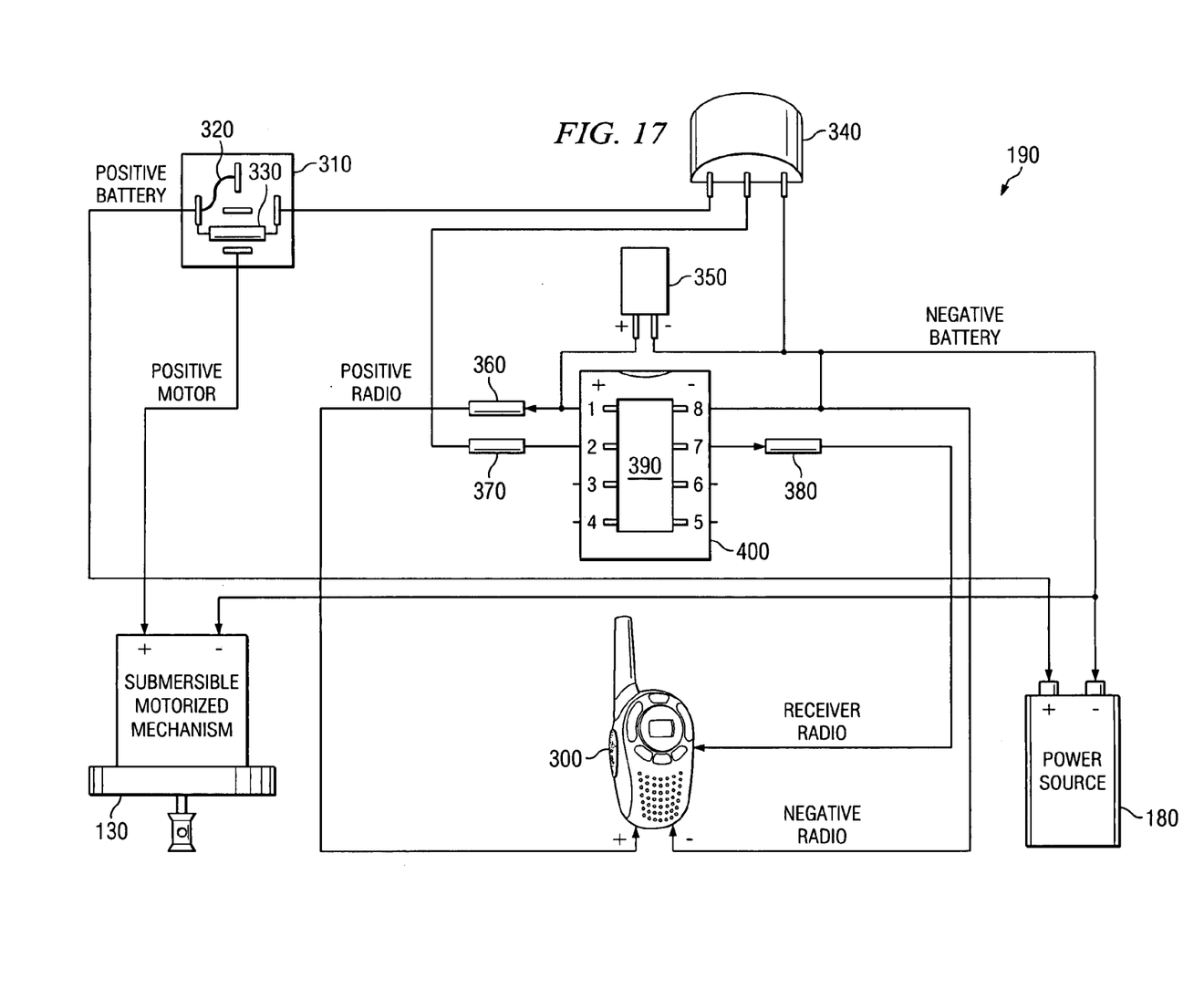
FIG. 17 shows a wiring diagram for attaching the radio remote control smart chip timer and the power relay to regulate the length of time that the motorized mechanism remains on or off.

FIG. 17 shows the wiring diagram for attaching the remote control mechanism (200), which in addition to the timer mechanism (190) controls the length of time and the speed of submersible motorized mechanism's (130). In a preferred embodiment, the timer mechanism comprises a programmable socket (400) with smart chip (390) (e.g. SKT 8-pin DIP Socket 390261-2 2-641260-3 (2-640463-3) 308-AG19DC with PIC12F629-I/P IC MCU CMOS FLASH-BASE 8BIT 8DIP, respectively). The smart chip was programmed using a universal programmer (e.g. SuperPro Universal Programmer, Xeltek Inc., Santa Clara, Calif.; LABTOOL-48 UNIVERSAL PROGRAMMER having SOFTWARE Version 3.2, Advantech Equipment Corp, TAIWAN). The electric switch (310) comprises a relay (e.g. model 0332209150, 12 V 20/30A relay, Bosch Electronics, Inc, Germany). The electric switch was modified by connecting the first and the second relay posts with a wire (320) (i.e. 16 AWG inert red) and the first and third relay posts with a diode (330) (i.e. Diode 1N40070). The first post of the electric switch (310) is in electric communication with the positive terminal of the battery, and the fourth post of the electric switch is in electric communication with the positive post of the motor. The third post of the electric switch is in electrical communication with a first post of a transistor (340) (e.g. XSTR 2N2222A PN2222AG TO-92 [ROHS]), as shown in FIG. 17. A second post of the transistor (340) is in electrical communication with the second post assembly of the smart chip through a resistor (370) (i.e. RES 470 ¼ 1% (XICON 271-470)). A third post of the transistor (340) is electrical communication with the negative battery post. The first post of the capacitor (350) is in electrical communication with the first pin assembly of the smart chip. The first post of the capacitor (350) is also in electrical communication with the positive terminal of the two way radio (200) through a diode (360) (e.g. DIODE 1N4148). The second post of the capacitor (350) is in electrical communication with the negative battery terminal. The negative terminal of the radio (200) is in electrical communication with the eighth pin assembly of the smart chip, and the seventh pin assembly of the smart chip is in electrical communication with the receiver of the radio through a resistor (380) (e.g. RES 22 ¼ 1% (XICON 271-22). One of ordinary skill in the art will understand that other electrical switches, relays, transistors, capacitors, diodes, and resistors are available and will work for connecting a radio receiver or a timer with an electric switch to activate the submersible motorized system, and are considered to be within the spirit and scope of the invention. Additionally, one of ordinary skill in the art will understand that integrated circuit boards having programmable or signal activated (e.g. sound, radio, UV, etc.) timers will also work for the purposes of this invention.

In a preferred embodiment, the remote control mechanism (200) can be operated using a hand held remote control mechanism controller (210) from a distance away from the submersible motorized system (130), even when the unit is below the surface of the water. A user can set the timer mechanism (190) remotely to a desired setting utilizing the remote control mechanism (200) and the hand held remote control mechanism controller (210) as shown in FIG. (7). However, any remote controlling mechanism capable of remotely operating or programming a portable or programmable timer mechanism capable of switching the portable motor off and on at predetermined time intervals or using some type of signal will be sufficient and is considered to be within the scope and spirit of this invention.

A user wishing to animate a decoy can first activate the power to the proper switch, timer, or remote control before closing the lid of the watertight housing (100) and securely fastening it down to the body container of the watertight housing (110) utilizing the watertight housing sealing system (170) or the user can close the lid of the watertight housing (100) and securely fasten it down to the body container of the watertight housing (110) utilizing the watertight housing sealing system (170) and then remotely set the timer mechanism (190) to animate a decoy using a hand held remote control mechanism controller (210). The user can then clip the line having the spool clip to the spool and the decoy clip to the keel hole (30) of the ordinary decoy (10). The watertight housing will then be lowered into the water by the line of the retractable line mechanism with a locking mechanism (90). When the watertight housing reaches the bottom, the user will close the locking mechanism (70), which should not allow the release of more line from the retractable line mechanism (40). With the timer mechanism (190) having been set, the submersible motorized mechanism (130) will turn on and off automatically. When turned on the submersible motorized mechanism (130) will turn the shaft (140) and spool (150) and wind up the line attached to the decoy. The tension will cause the decoy (10) to be pulled below the surface of the water and simulate diving, dabbling, and feeding activities without further intervention from the operator.

However, if the operator wishes to change the pattern of the animated waterfowl decoy, the hand held remote controller (210) can be utilized to operate the remote control mechanism (200) from a distance away from the battery operated submersible motorized system and above the surface of the water.

Thus, the battery operated submersible motorized system can turn almost any ordinary decoy into a diving, dabbling, and feeding animated decoy when it is attached to the system. The battery operated submersible motorized system is easy to use, quick to set up and will operate continuously without intervention by the operator. The operator can simply allow the timer mechanism to run the system or can take control of the system by the remote control mechanism to cause the decoy to simulate diving, dabbling, and feeding for waterfowl that may be approaching the operator. Because the battery operated submersible motorized system brings such lifelike diving, dabbling, and feeding to ordinary decoys, users of this invention may attract and see more waterfowl when compared to using traditional non-animated decoys.

Example 3

The method of animating a waterfowl decoy is indicated below. The method described below uses a preferred apparatus ("Decoy Dabbler"), which was described in Examples 1 and 2. The Decoy Dabbler's watertight housing is constructed to prevent water from entering the submerged unit and ruining sensitive electrical components.

Figure 15:
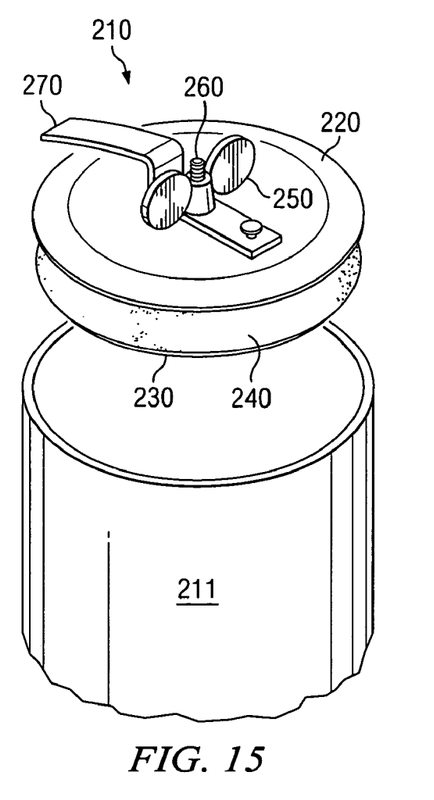
FIG. 15 shows a pressure-sealed lid and a cylindrical water tight chamber. The lid having an upper and lower plate, a rubber gasket, screw down wing nut with bolt, and a carrying handle with a mounting stud.

As shown in FIG. 15, the pressure-sealed lid (210) of the Decoy Dabbler and is constructed of several, simple to use, components; upper (220) and lower plate (230), rubber gasket (240), screw down wing nut (250) and bolt (260), and a carrying handle with a mounting stud (270). The pressure-sealed lid (210) fits into the cylindrical watertight container the houses the water sensitive electronics (201). The Decoy Dabbler is designed to function underwater. Therefore, prior to submerging the unit under water the Decoy Dabbler should be made watertight. To make the container watertight place the pressure-sealed lid into the cylindrical plastic container (201). By screwing down the wing nut onto the bolt the upper and lower plates squeeze together causing the rubber gasket to push outward creating a watertight fit. Remember to remove the submersible pump from the mounting stud before screwing down the wing nut. It is not recommended to carry the Decoy Dabbler by only the lid handle, even when the pressure-sealed lid is tightened down, as damage to the unit could result from slipping, dropping or from the watertight seal being compromised allowing water to enter the unit. Tighten down the wing nut securely to insure a proper watertight seal is created. Upon tightening down the wing nut make sure to position the mounting stud on the handle so as to be able to re-mount the submersible pump. Make sure to securely fit the Pressure-Sealed Lid snuggly in order to maintain a watertight seal.

The decoy reel is a spring reel system that helps to minimize tangled decoy lines and allows for easy deployment and retrieval of the Decoy Dabbler (See FIGS. 10 and 11). There are two lines coming from the reel. (e.g. the decoy line and the reel line). The decoy line simply attaches to the front keel hole in a waterfowl decoy by a swivel snap. The reel line runs through the hole of the submersible pump case, through the spool and the spool then is pushed over the shaft of the submersible pump. To deploy the Decoy Dabbler hold the decoy reel in the palm of a user's hand. Pull the reel line from the reel until the desired depth is reached. Press down on the spinning spool of the decoy reel this will prevent the decoy reel from releasing anymore line. Wrap the line around the decoy reel hook 3 or 4 times. This will prevent more line from being released and allow the submersible pump to submerge the decoy.

The Decoy Dabbler operates both by a programmed smart chip timer for hands free operation or remotely by a pair of two way radios (e.g. Cobra Micro Talk, Cobra Electronics Inc., Chicago, Ill.) for stronger underwater remote control performance (See FIG. 16). The smart chip timer allows for the Decoy Dabbler to be deployed in depths of water up to about 3 feet deep for hands free use. To use the remote control function of the Decoy Dabbler, in addition to the smart chip timer, the unit can be in up to about 3 feet of water. Decoy Dabbler's remote control feature may not work in over about 3 feet of water.

The radio remote controls have several buttons for their use as communication devices. Although each of these buttons remain active, they will have no function in regards to the Decoy Dabbler. There are only three buttons that are needed for controlling the Decoy Dabbler (a) the on/off button; (b) the main talk button; and (c) the channel button.

There are at least two radios needed to use the Decoy Dabbler. One unit radio goes inside the watertight container. The other radio is the controlling radio, and remains with the user. Both radios should be turned on before deploying the Decoy Dabbler. This is done by pressing the on/off button. After turning on both radios, place the under water controlling radio inside the watertight container and reseal the Pressure-Sealed lid adequately before allowing the Decoy Dabbler to go under the water.

The smart chip can be programmed using a universal programmer (e.g. SuperPro Universal Programmer, Xeltek Inc., Santa Clara, Calif.). Shown below are examples of at least five preferred smart chip timer settings for the Decoy Dabbler.

1. 16 seconds off and 2 seconds on (longer battery life)
2. 12 seconds off and 2 seconds on
3. 8 seconds off and 2 seconds on (Default Setting)
4. 4 seconds off and 2 seconds on (shorter battery life)
5. 30 days off and 0.01 seconds on (standby)

To animate the decoy press and hold the main talk button for about 6 seconds, this activates the smart chip timer within the Decoy Dabbler. If nothing more is done, the timer will simply set itself to the default setting of 8 seconds off and 2 seconds on.

To set a smart chip timer setting, the user will need to hold the main talk button for about 6 seconds to activate the smart chip timer, then the user will have about 10 seconds to program the smart chip Timer if the user chooses to have a different setting than the default setting. Within the 10 seconds press the main talk button:

1. once for 16 seconds off and 2 seconds on (longer battery life),
2. twice for 12 seconds off and 2 seconds on,
3. three times for 8 seconds off and 2 seconds on, and
4. four times for 4 seconds off and 2 seconds on (shorter battery life)
5. five times for 30 days off and 0.01 seconds on (standby)

To turn off the smart chip timer, press and hold the main talk button for about 6 seconds. The timer will no longer operate the submersible pump, however the radio inside of the watertight container will still be on and will need to be shut off manually.

Additionally, after the smart chip timer has been set the user can remotely control the activity of the Decoy Dabbler by quickly pressing and letting go of the main talk button. However, if the user presses and holds the main talk button for about 6 seconds you will shut the unit off.

Example 4

In one preferred embodiment, several Decoy Dabbler units can be controlled using one radio handset. The user designates a separate channel for each submerged unit using the channel button. With the hand held radio the user can switch between each submerged unit by switching between channels. However, if several Decoy Dabbler units are going to be submerged in more than about 3 feet of water the user will need to, activate the smart chip timer before lowering the units beyond 3 feet of water and retrieve the Decoy Dabbler up to at least 3 feet of water before turning off the smart chip timer. Upon turning on the smart chip timer, the user has about 10 seconds to deploy the unit.

The Decoy Dabbler unit should be submerged in water when turning on the smart chip timer and during use or pump damage may occur. When collecting the Decoy Dabbler after operation, it is preferred that the user utilizes the decoy reel line only to bring the Decoy Dabbler up to the surface of the water. The handle should be used to remove the Decoy Dabbler from the water.

While the systems and methods of this invention have been described in terms of preferred embodiments, it will be apparent to those of skill in the art that variations may be applied to the systems, methods, and in the steps or in the sequence of steps of the method described herein without departing from the concept, spirit and scope of the invention. More specifically, it will be apparent that certain materials that are both functionally and mechanically related might be substituted for the materials described herein while the same or similar results would be achieved. All such similar substitutes and modifications to those skilled in the art are deemed to be within the spirit, scope and concept of the invention as defined by the appended claims.

REFERENCES CITED

The following references, to the extent that they provide exemplary procedural or other details supplementary to those set forth herein, are specifically incorporated herein by reference.

U.S. Patent Documents

U.S. Pat. No. 6,643,971 issued to Daniels on Nov. 11, 2003, and titled Waterfowl Feeding Decoy.
U.S. Pat. No. 5,566,491 issued to Phillips on Oct. 22, 1996, and titled Method and Apparatus for Animating a Floating Waterfowl Decoy.
U.S. Pat. No. 5,377,439 issue to Roos, et al., on Jan. 3, 1995, and titled Remote Controlled Decoy.
U.S. Pat. No. 4,566,214 issued to McCrory, et al., on Jan. 28, 1986, and titled Feeding Wildfowl Decoy.
U.S. Pat. No. 3,689,927 issued to Boston on Sep. 5, 1972, and titled Radio-Controlled Decoy.
U.S. Pat. No. 3,115,721 issued to Story on Dec. 31, 1963, and titled Duck Decoy.
U.S. Pat. No. 3,000,128 issued to McAda on Sep. 19, 1958, and titled Mechanized Waterfowl Decoy.

What is claimed:

1. A submersible decoy animation apparatus, comprising:
(a) a portable power supply;
(b) a switch in electronic communication with the portable power supply;
(c) an electric motor in electronic communication with the switch, wherein the electric motor drives a shaft, and the shaft is connected to a spool that is capable of rotating when the electric motor is activated such that the spool is capable of changing the length of the line between the waterfowl decoy and the spool by winding the line around the spool;
(d) a line having a first end capable of being attached to the spool, and a second end being attached to a waterfowl decoy, wherein the line is longer than about 6 inches in length;
(e) a means for protecting the portable power supply, the switch, and the electric motor from water damage when the apparatus is submerged in water and the waterfowl decoy is on the surface of the water, wherein the means for protecting the portable power supply, the switch and the electric motor from water damage comprise a waterproof coating or a watertight compartment; and
(f) a timer capable of switching the electric motor off or on at a defined interval;
wherein the watertight compartment further comprises a cylindrical container closed on one end and a pressure-sealed lid, wherein the pressure-sealed lid is constructed having an upper plate, a lower plate, a rubber gasket, a screw down wing nut with a bolt, and a carrying handle with a mounting stud.

* * * * *